United States Patent [19]
Hittt

[11] Patent Number: 6,081,797
[45] Date of Patent: Jun. 27, 2000

[54] ADAPTIVE TEMPORAL CORRELATION NETWORK

[75] Inventor: Ben A. Hittt, Wheeling, W. Va.

[73] Assignee: American Heuristics Corporation, Triadelphia, W. Va.

[21] Appl. No.: 08/890,042

[22] Filed: Jul. 9, 1997

[51] Int. Cl.[7] .................................................. G06E 1/00
[52] U.S. Cl. .............................. 706/25; 706/21; 704/240
[58] Field of Search ........................................ 706/25, 21

[56] References Cited

U.S. PATENT DOCUMENTS

| | | | |
|---|---|---|---|
| 5,040,214 | 8/1991 | Grossberg et al. | 704/240 |
| 5,479,573 | 12/1995 | Keeler et al. | 706/21 |
| 5,515,490 | 5/1996 | Buchanan et al. | 345/302 |

OTHER PUBLICATIONS

I. Kirschning et al., Phoneme Recognition Using a Time–Sliced Recurrent Recognizer, Jul. 1994 IEEE International Conference on Neural Networks, vol. 7, pp. 4437–4441.

F. Zhong et al., An NN–Based Dynamic Time–Slice Scheme for Bandwidth Allocation in ATM Networks, Proceedings of Sep. 1997 International Conference on Information, Communications and Signal Processing, 1997, vol. 1, pp. 345–350.

B.W. Stiles et al., A Habituation Based Neural Network for Spatio–Temporal Classification, Proceedings of the Sep. 1995 IEEE Workshop on Neural Networks for Signal Processing[1995]V, pp. 135–144.

American Heuristics Corporation, http://micky.heuristics.com/, Mar. 18, 1999, 11:22 AM.

M. Paolini, http://phaistos.uscd.edu/~paolini/revcorr–diagram.html/, Mar. 18, 1999, 11:34 AM.

*Primary Examiner*—Tariq R. Hafiz
*Assistant Examiner*—Wilbert L. Starks, Jr.
*Attorney, Agent, or Firm*—Steptoe & Johnson

[57] ABSTRACT

The present invention comprises an adaptive temporal correlation network (ATCN) that correlates data patterns, or events, over time. More specifically, the ATCN comprises a plurality of time slices wherein each time slice represents one or more data streams that have occurred at the same time. The ATCN assigns each data stream to a module in the time slice. The ATCN analyzes each data stream and identifies and classifies a data pattern/event found within the data stream. Once an event is found, the ATCN flags that event as active within the module and creates temporal connections between the active event and all other events within the network. The present invention also has a prediction phase in which the probability of the occurrence of future events is predicted. When predicting the occurrence of future events, the ATCN receiving an event, locates that event within the network, and traverses the temporal connections of that event to identify other events in the current time slice and other time slices that are most likely to occur.

24 Claims, 9 Drawing Sheets

ADAPTIVE TEMPORAL CORRELATION NETWORK

BACKGROUND OF THE INVENTION

1. Field of the Invention

This invention relates to neural networks, and more specifically, to a self organizing neural architecture that recognizes and learns patterns, and correlates the patterns over time thereby predicting the future occurrence of patterns.

2. Related Art

Corporations and organizations are overwhelmed with the quantity of data they collect because nearly every business transaction is monitored. Transactions, or events, are monitored for various reasons, such as, security, marketing, determining inventory or schedules, tracing travel routes, trending analysis, among others. Each event has data associated with it which is monitored by various data sources including, but not limited to, news media, satellite transmissions, and/or electronic/digital transmissions. Therefore, an event is described by one or more data sources, and each event can be correlated to other events. A problem arses however, when unrelated data is to be correlated The current method for analyzing a large collection of unrelated data is very inefficient and ineffective. First, a user decomposes all of the monitored data into one or more data streams, wherein each data stream represents a separate, well-defined area or type of data from a single data source. Once the decomposition is complete, the user assigns one or more data streams to an analyst for review. The analyst reviews the data streams assigned to him and identifies and locates one or more patterns, or events, in the data streams. Second, after all of the patterns are identified, the analyst attempts to correlate the patterns found within the data streams assigned to him with the patterns found in other data streams by other analysts. Therefore, under the current method, multiple persons review separate pieces of data in hopes to locate one or more patterns and correlations between those patterns across the multiple data streams.

To further complicate the process, a priority is often assigned to specific data streams. An experienced or senior analyst is then assigned to review one or more high priority data streams, and a junior analyst is assigned to data streams of low priority. This assignment, however, does not always identify the important data patterns because the important data patterns or correlations of data patterns are most often located in data streams of low priority or across multiple data streams. Therefore, under the conventional method, there is a high probability that important data patterns and correlations of data patterns will be overlooked and not identified.

One obvious disadvantage with the current method of determining data patterns and their correlations with other data patterns is that people are reviewing the data. Due to the ever increasing quantity of data being monitored and available for analysis, there is an increasing need for data analysts, especially for qualified and experienced data analysts. The workforce, however is diminishing, such that it is getting, and will continue to get, more difficult to find people to be data analysts. Therefore, there is a need to automate the review and analysis of data, comprised of multiple, unrelated data streams, so that one analyst can manage a large quantity of data.

A second disadvantage with the current method is that when multiple persons review multiple data streams, there is a high probability that they will miss a large number of correlated or concurrent events between the data streams. There is a loss of connectivity between the data streams. Therefore, there is a need for a way to correlate the events within one data stream to the events within another data stream whether the data streams occurred at the same time or at different time periods.

A third disadvantage with the current method is that current software technology is only available for the first step of the problem; that is, there are currently at least two methods for recognizing and classifying a data pattern in a single data stream. These methods are Fuzzy Adaptive Resonance Theory (Fuzzy ART) and Lead Clustering. Both methods are well-known and well published in the relevant art. In summary, Fuzzy ART determines how close two patterns match each other by calculating the closeness, or flizziness, of the fit, e.g., two pattern are a seventy-five percent (75%) match. With Fuzzy ART, a user can set the acceptable value of fuzziness for determining a match. Thus, Fuzzy ART monitors a data stream for patterns and groups them together based on the percentage of similarity.

In contrast, Lead Clustering is based on distance measurements. When a first pattern is identified, it is given a point in N-dimensional space. A user then defines a radius around that point such that if a second pattern fails within the radius of the point corresponding to the first pattern, then the second pattern is a match, or belongs to the same cluster, of the first pattern. If a point defining another pattern falls outside of the radius, then a new cluster or pattern is detected. As a cluster is defined by various points, this method can also stabilize the pattern associated with the cluster by moving the centroid of the circle according to the points defining the cluster. Thus, Lead Clustering monitors a data stream for patterns and groups them together based on distance.

Both Fuzzy ART and Lead Clustering only work when analyzing a single data stream for known data patterns. These current methods cannot correlate identified data patterns over time. Therefore, there is a need for a system that identifies patterns in multiple data streams and correlates those data patterns over time, such that predictions can be made upon the occurrence of a known data pattern.

SUMMARY OF THE INVENTION

The present invention solves the problem of correlating identified data patterns from multiple data streams over time by creating an adaptive temporal correlation network (ATCN). The ATCN comprises two steps. First, the ATCN inputs one or more data streams from different data sources at a predetermined time interval such that for a specific time T, the ATCN inputs multiple data streams. The ATCN collects the data streams for time T into a time slice T, wherein each data stream has a corresponding pattern recognition module. At a predetermined time interval T+1, the ATCN collects another set of data streams for time slice T+1. Therefore, the ATCN has multiple time slices representing data streams that occurred at various times.

Each pattern recognition module, or module, of a time slice contains a set of pre-configured patterns/events called nodes. The nodes are configured to conform to a particular pattern/event architecture but not a specific pattern or event. For each data stream, the ATCN uses any self organizing adaptive device, e.g. Fuzzy ART or Lead Clustering, as the pattern recognition module to identify and classify a data pattern or event. Once an event has been identified in a data stream, the ATCN matches the event with its corresponding node in the associated module. If the associated node does not have a matching node, the ATCN creates a new node in the associated module to match the new event.

Once an event has been matched with a node in a module in the time slice, the ATCN connects the event to the events in the modules contained within the same time slice as well as to the events in the modules of other time slices. Therefore, the ATCN creates temporal connections within the same time slice and between the time intervals. The ATCN creates and maintains both current connections and connections over time between the multiple time slices.

The advantage of the present invention is that the ATCN maximizes current technology by identifying and classifying events in multiple data streams, and then expands that technology over time by creating and maintaining temporal connections between the events of each time slice. Therefore, an analyst uses these temporal connections to predict the occurrence of an event upon the identified occurrence of a specific event.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

1. Host System of a Preferred Environment for the Present Invention

Figure 1:
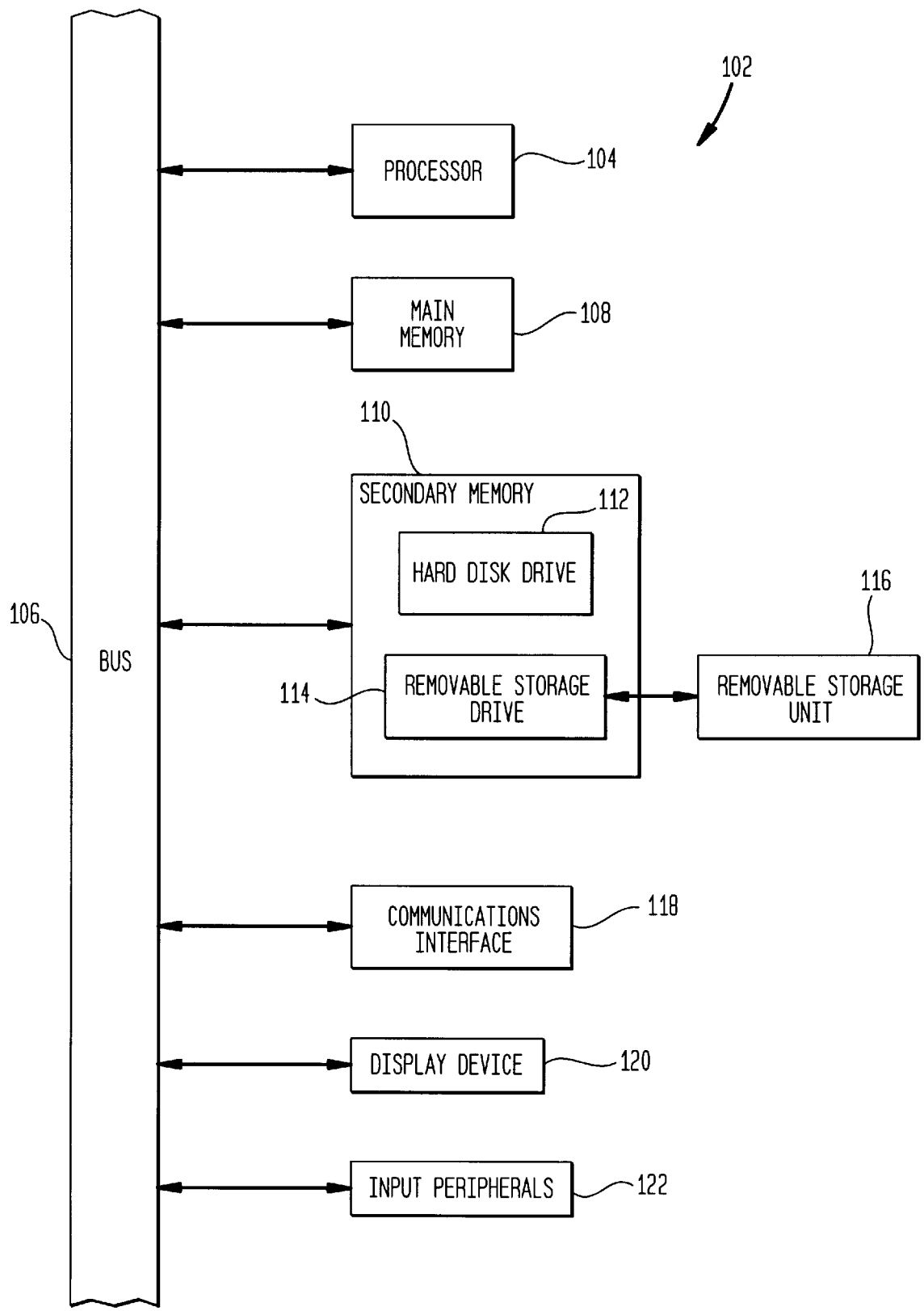
FIG. 1 is a block diagram showing an exemplary computer system useful for implementing the present invention.

The chosen embodiment of the present invention is computer software executing within a computer system. FIG. 1 shows an exemplary computer system. The computer system 102 includes one or more processors, such as a processor 104. The processor 104 is connected to a communication bus 106.

The computer system 102 also includes a main memory 108, preferably random access memory (RAM), and a secondary memory 110. The secondary memory 110 includes, for example, a hard disk drive 112 and/or a removable storage drive 114, representing a floppy disk drive, a magnetic tape drive, a compact disk drive, a program cartridge and cartridge interface (such as that found in video game devices), a removable memory chip (such as EPROM or PROM), etc. which is read by and written to by a removable storage unit 116. The removable storage unit 116, also called a program storage device or a computer program product, represents a floppy disk, magnetic tape, compact disk, etc. As will be appreciated, the removable storage unit 116 includes a computer usable storage medium having stored therein computer software and/or data. The removable storage drive 114 reads from and/or writes to a removable storage unit 116 in a well known manner.

The computer system 102 may also include other similar means for allowing computer programs or other instructions to be loaded. Such means can include, for example, a communications interface 118. Communications interface 118 allows software and data to be transferred between computer system 102 and external devices. Examples of communications interface 118 can include a modem, a network interface (such as an Ethernet card), a communications port, etc. Software and data transferred via communications interface 118 are in the form of signals which can be electronic, electromagnetic, optical or other signals capable of being received by communications interface 118.

In this document, the term "computer program product" is used to generally refer to removable storage unit 116, a hard disk installed in hard disk drive 112, and signals transferred via communications interface 118. These computer program products are means for providing software to a computer system 102.

In an embodiment where the invention is implemented using software, the software may be stored in main memory 108, or in a computer program product and loaded into computer system 102 using removable storage drive 114, hard disk drive 112, or communications interface 118. The software, when executed by the processor 104, causes the processor 104 to perform the functions of the invention as described herein.

In another embodiment, the invention is implemented primarily in hardware using, for example, a hardware state machine. Implementation of the hardware state machine so as to perform the functions described herein will be apparent to persons skilled in the relevant arts.

The preferred embodiment of the present invention is also directed to a computer system 102 including a display device 120 and one or more input peripherals 122. The display device 120 represents a computer screen or monitor on which a graphical user interface, including a window environment, may be displayed. The input peripherals 122 include, for example, a keyboard, a mouse, a light pen, a pressure-sensitive screen, etc., which provide a user with the capability of entering input to the computer system 102.

The preferred embodiment of the present invention is directed to execute on a computer system 102 using the UNIX operating system. UNIX is commercially available and is well known in the relevant arts. The preferred computer system 102 is a SUN workstation, but the present invention also can be developed on a personal or mainframe computer. The present invention is described in terms of a computer system 102 having a single processor 104 for convenience purposes only. It would be readily apparent, however, to one skilled in the relevant arts to use a computer system 102 having multiple processors 104, thereby executing the present invention in parallel. There are no memory requirements for developing and executing the present invention; however, the present invention is memory intensive. Therefore, the computer system 102 achieves better performance with more main memory 108 and secondary memory 110. The preferred embodiment of the present invention is implemented in software, and more specifically, is written in the programming language C++. The preferred embodiment is described in these terms for convenience purpose only. Other comparable computer systems 102, operating systems, and programming languages could alternatively be used.

2. Overview of an Adaptive Temporal Correlation Network

Figure 2:
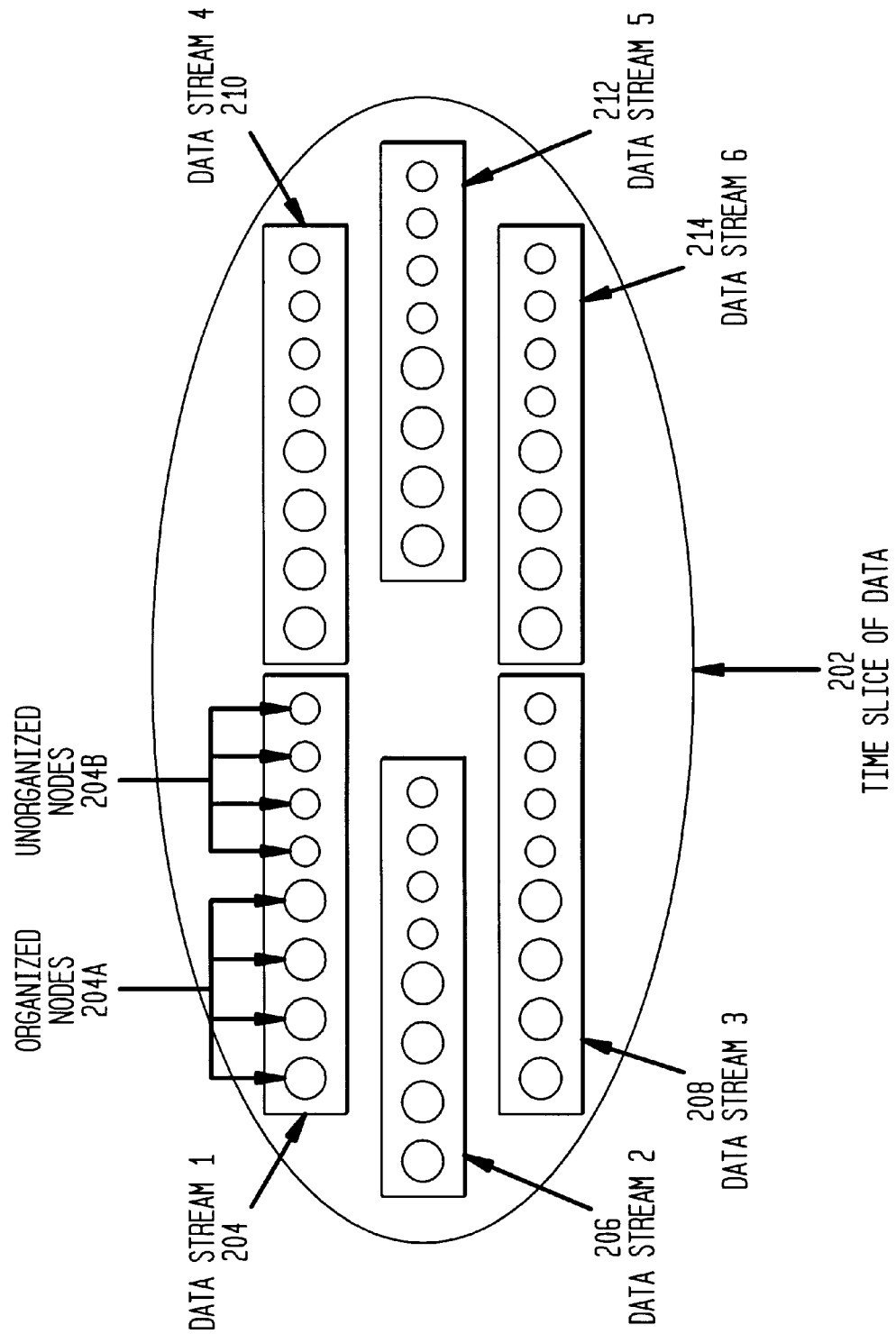
FIG. 2 is a block diagram showing a time slice of a plurality of data streams.

FIG. 2 is a block diagram showing a time slice of a plurality of data streams. The time slice 202 is depicted by an oval shape containing a plurality of modules 204, 206, 208, 210, 212, 214, wherein each module 204–214 represents a single data stream represented one particular way. A module 204–214 consists of a plurality of organized nodes 204a and unorganized nodes 204b, wherein each organized node 204a represents a specific data pattern or event identified in the data stream corresponding to the module 204–214. An unorganized node 204b does not represent a data pattern or event, but is used when a novel event is detected in the module's 204–214 corresponding data stream. Therefore, when the ATCN identifies a new event in a data stream, the ATCN instantiates an unorganized node 204b to represent the newly detected event, thereby converting the unorganized node 204b to an organized node 204a.

In the preferred embodiment of the present invention, a user of the ATCN sets the number of total nodes (organized nodes 204a plus unorganized nodes 204b) in a module 204–214. Further, in the preferred embodiment, a module 204–214 contains 250 total nodes, of which at any one time approximately twenty to twenty-five are organized nodes 204a. The number of modules 204–214 and nodes 204a, 204b are described in these terms for convenience purpose only. It would be readily apparent to one skilled in the relevant arts to implement an ATCN with a different number of modules 204–214 and total nodes 204a, 204b.

As described above, the two known methods for identifying and classifying patterns are Fuzzy ART and Lead Clustering. Applying these methods to the present invention, a user can determine to use either or both methods within the same ATCN. More specifically, a user assigns which method to use for each module 204–214 in a time slice 202. The user may, for instance, base his decision on the specific type of data stream corresponding to a module 204–214. There may be specific instances when the user prefers to use one method over the other. Once a user assigns a method to a module 204–214, then in every time slice the data stream corresponding to that module 204–214 must always be analyzed by that method. The preferred embodiment is described in terms of Fuzzy ART and Lead Clustering for convenience purpose only. It would be readily apparent to one skilled in the relevant art to analyze the data streams of the modules 204–214 of a time slice 202 with a comparable self organizing adaptive device.

In operation, the ATCN of the present invention receives one or more data streams at time slice T 202. The ATCN matches each data stream with its corresponding module 204–214. For each module 204–214 for which a data stream was received at time slice T 202, the ATCN uses a self organizing adaptive device, as described above, to identify and classify the data pattern, or event, contained in the data stream.

Once the event has been classified, the ATCN matches the event with an organized node 204a in the corresponding module 204–214. If there is a match, the matching organized node 204a is called the active organized node. There is only one active organized node 204a in a module 204–214 at any one time. If there is no match for the identified event, then the event is novel and the ATCN instantiates an unorganized node 204b into an organized node 204a to represent the newly identified event.

When a time slice is created according to the present invention, the ATCN creates temporal connections for each organized node 204a of each module 204–214. Specifically, a temporal connection is a link or pointer, from each organized node 204a of each module 204–214, e.g. module 204, to each organized node 204a of every other module 204–214, e.g. modules 206–214, in the current time slice T 202 and in every other time slice in the ATCN. Therefore, each organized node 204a of a module 204–214 has a temporal connection to each organized node 204a of another module 204–214. Further, in the preferred embodiment, the nodes of a module do not have temporal connections to the nodes of the same module in other time slices. However, in an alternative embodiment, such temporal connections may be maintained.

Only one such temporal connection from a first module 204–214 to a second module 204–214 can be active at any one time. An active temporal connection is the temporal connection from an active organized node of a first module 204–214 to an active organized node of a second module 204–214. Temporal connections will be described in greater detail below.

Figure 3:
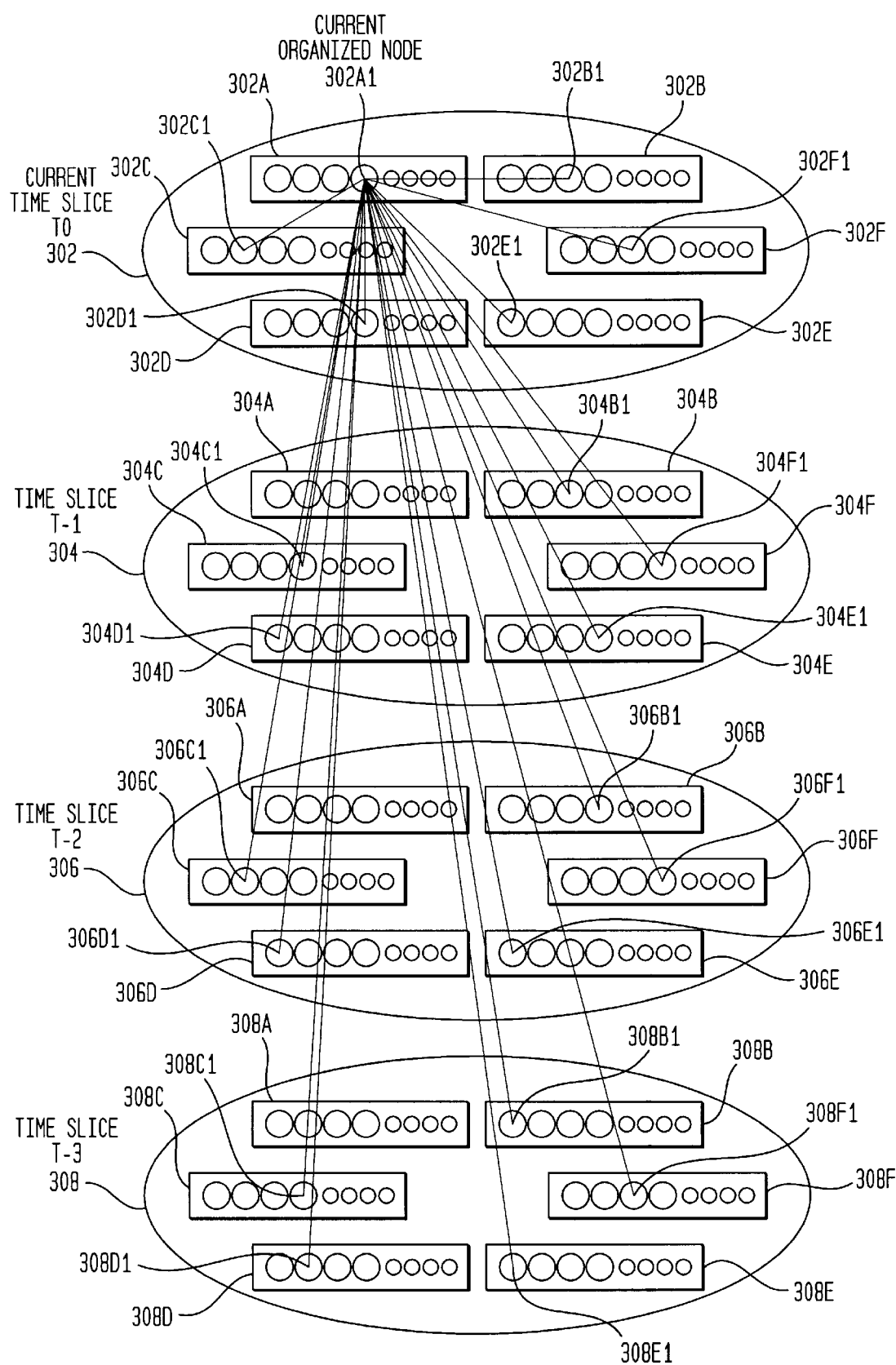
FIG. 3 is a block diagram showing an adaptive temporal correlation network (ATCN), having a plurality of time slices in which a current event is correlated to prior events.

FIG. 3 is a block diagram showing an ATCN 300 having a plurality of time slices in which a current event is correlated to prior events. The ATCN 300 comprises four (4) time slices: a current time slice T0 302, time slice T–1 304, time slice T–2 306, and time slice T–3 308. Therefore, FIG. 3 depicts time moving from time slice T–2 308 to the current time slice T–0 302. Further, the ATCN 300 of the present invention creates each time slice 302, 304, 306, 308 as described above. The ATCN 300 is described in terms of four time slices for convenience purpose only. It would be readily apparent for one skilled in the relevant art to create a ATCN comprised of a different number of time slices.

A subset of all the temporal connections in the ATCN 300 are shown for convenience purpose only. Specifically, only the active temporal connections for the organized node 302a1 in module 302a of the current time slice T0 302 are depicted. As shown, the following is a complete list of the active temporal connections of the organized node 302a1, wherein each temporal connection originates from a current organized node 302a1 and ends at a target node:

1. 302a1→302b1;
2. 302a1→302c1;
3. 302a1→302d1;
4. 302a1→302e1;
5. 302a1→302f1;
6. 302a1→304b1;
7. 302a1→304c1;
8. 302a1→304d1;
9. 302a1→304e1;
10. 302a1→304f1;
11. 302a1→306b1;
12. 302a1→306c1;
13. 302a1→306d1;

14. 302*a*1→306*e*1;
15. 302*a*1→306*f*1;
16. 302*a*1→308*b*1;
17. 302*a*1→308*c*1;
18. 302*a*1→308*d*1;
19. 302*a*1→308*e*1; and
20. 302*a*1→308*f*1.

Therefore, each of the nodes depicted on the right side of the "→" is a target node.

As noted, in the preferred embodiment, the organized node 302*a*1 does not have a temporal connection, active or otherwise, with the nodes of the same module 304*a*, 306*a*, 308*a* in other time slices 304, 306, 308. However, it would be readily apparent for one of ordinary skill in the relevant art to create a temporal correlation network in which an organized node 302*e*1 of a module have temporal connections to the organized nodes of the same module 304*a*, 306*a*, 308*a* in different time slices 304, 306, 308.

In an alternative embodiment, the ATCN 300 may assign a weighted value, such as a simple frequency counter, probability weighting or Baysian weighting, to each temporal connection. Such a coefficient would assist analysts in reviewing the correlation among events over time. Weighted values are well known in the relevant arts and it would be readily apparent to one of ordinary skill in the relevant art to use such weighted values with the temporal connections of the present invention.

Figure 4:
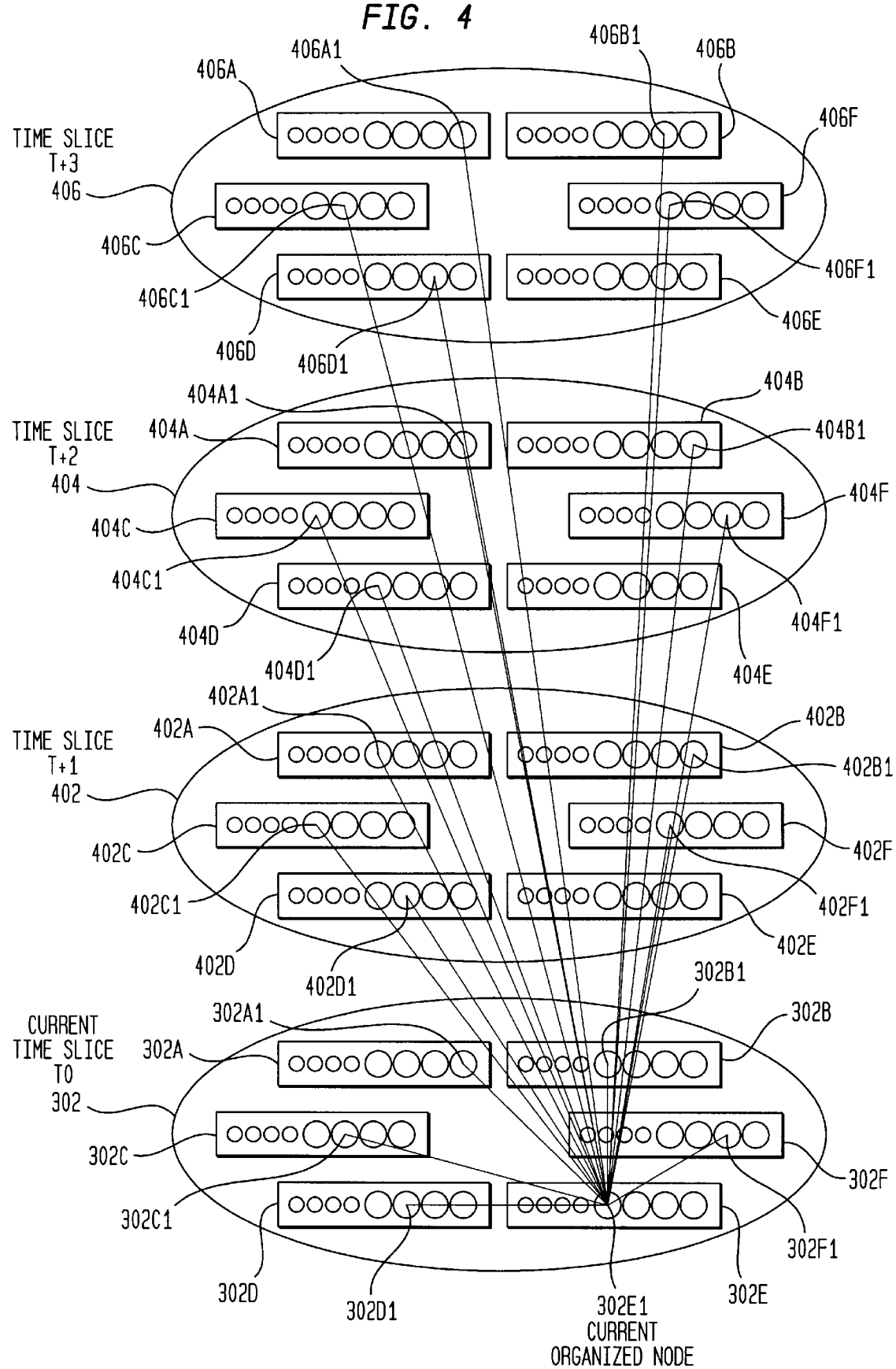
FIG. 4 is a block diagram showing the ATCN, having a plurality of time slices in which future events are predicted from the occurrence of a current event.

The active temporal connections in the ATCN 300 indicate the emergence of patterns of events over time, from time slice T3 308 to the current time slice T–0 302. Therefore, once events are correlated over time, an analyst can be assigned to review the data streams and events of interest to determine whether an important pattern sequence really does exist; that is, to determine how events are related FIG. 4 is a block diagram showing a ATCN 400 having a plurality of time slices in which future events are predicted from the occurrence of a current event. In this example, the ATCN 400 comprises four (4) time slices: a current time slice T0 302, time slice T+1 402, time slice T+2 404, and time slice T+3 406. Therefore, FIG. 4 depicts time moving from the current time slice T0 302 to the future time slice T+3 406. The ATCN 400 of the present invention creates each time slice 302, 402, 404, 406 as described above. The ACTN 400 is described in terms of four time slices for convenience purpose only. It would be readily apparent for one skilled in the relevant art to create a ATCN comprised of a different number of time slices.

In the prediction phase, the ATCN 400 inputs a single, current data stream at the current time slice T0 302. Using one of the methods described above for identifying and classifying data patterns in a data stream, Fuzzy ART or Lead Clustering, the ATCN 400 determines the occurrence of a current event in the current data stream. The ATCN 400 finds the module, e.g. current module 302*e*, at time slice T0 302 that corresponds to the current data stream, and finds the current organized node 302*e*1 within the current module 302*e* that corresponds to the current event identified in the current data stream Once the current organized node 302*e*1 is identified, the ATCN 400 traverses the temporal connections originating from the current organized node 302*e*1. The ATCN 400 analyzes each temporal connection to determine whether the target node is active. If the target node is active, the temporal connection from the current organized node 302*e*1 to the target node is an active temporal connection. Because each module 302*a–f*, 402*a–t* 404*a–f*, 406*a–f* can only have one active node at a time, there can at most be one active temporal connection to a target module 302*a–d*, 302*f* that originates from the current node 302*e*1 of the current module 302*e*. In this example, the active target nodes for the current node 302*e*1 are:

1. 302*a*1;
2. 302*b*1;
3. 302*c*1;
4. 302*d*1;
5. 302*f*1;
6. 402*a*1;
7. 402*b*1;
8. 402*c*1;
9. 402*d*1;
10. 402*f*1;
11. 404*a*1;
12. 404*b*1;
13. 404*c*1;
14. 404*d*1;
15. 404*f*1;
16. 406*a*1;
17. 406*b*1;
18. 406*c*1;
19. 406*d*1;and
20. 406*f*1.

If a target node is active, the ATCN 400 records that active target node in a prediction list. Therefore, the prediction list is a composite of all of the events that are likely to occur due to the occurrence of the current event at time slice T0 302. If a weighted value is assigned to an active temporal connection, then the prediction of the likelihood of its associated event occurring can be made with some degree of certainty. Further, the ATCN can also make a time prediction as to when an active target node in the prediction list may occur by reporting the time slice containing each active target node. A time slice indicates at what time interval from the current time slice the active target node most likely will occur.

3. Control Flow of a Current Time Slice in the Temporal Network

Figure 5:
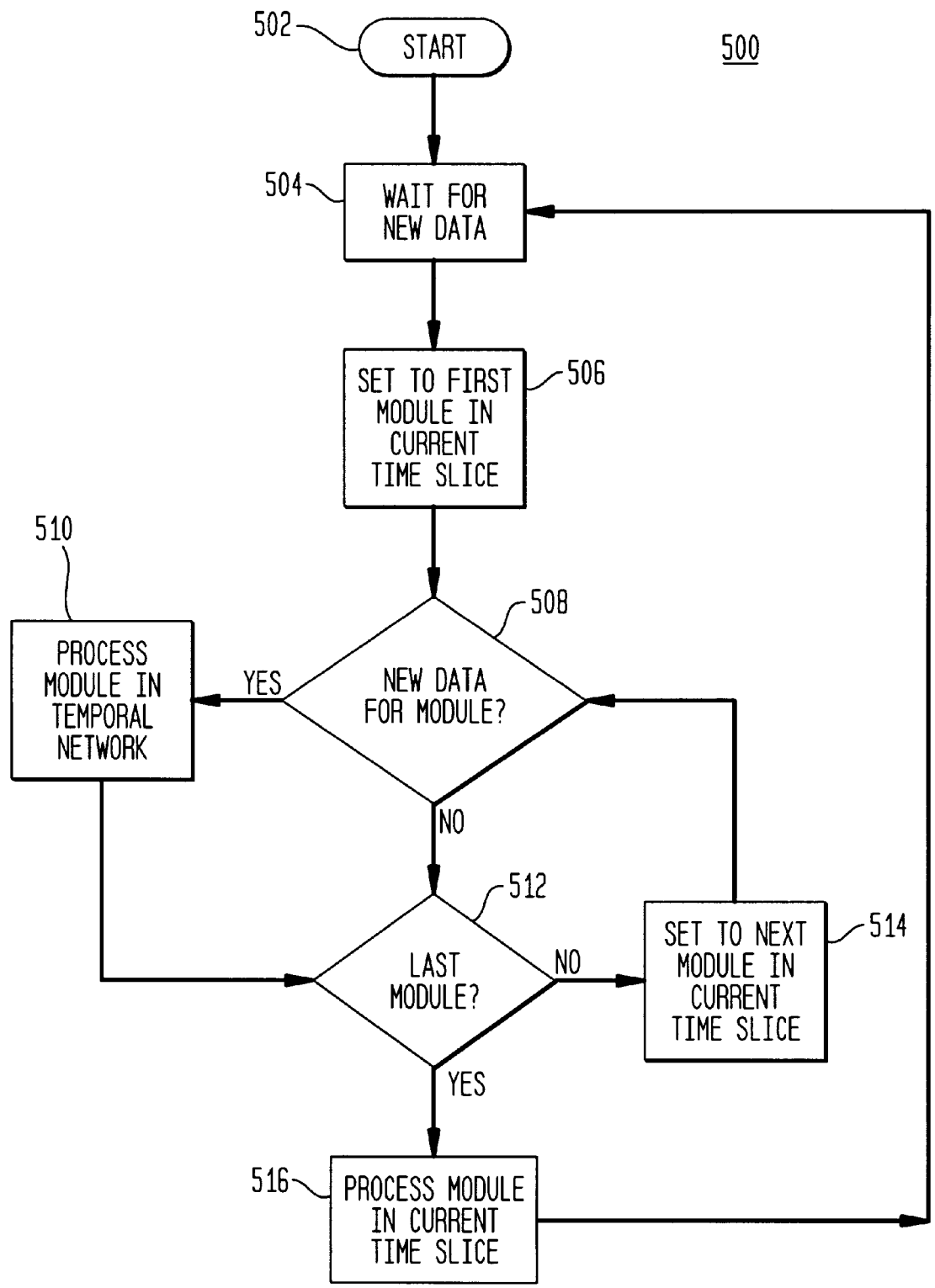
FIG. 5 is a control flow diagram showing the processing of a current time slice of data streams in the ATCN.
Figure 6:
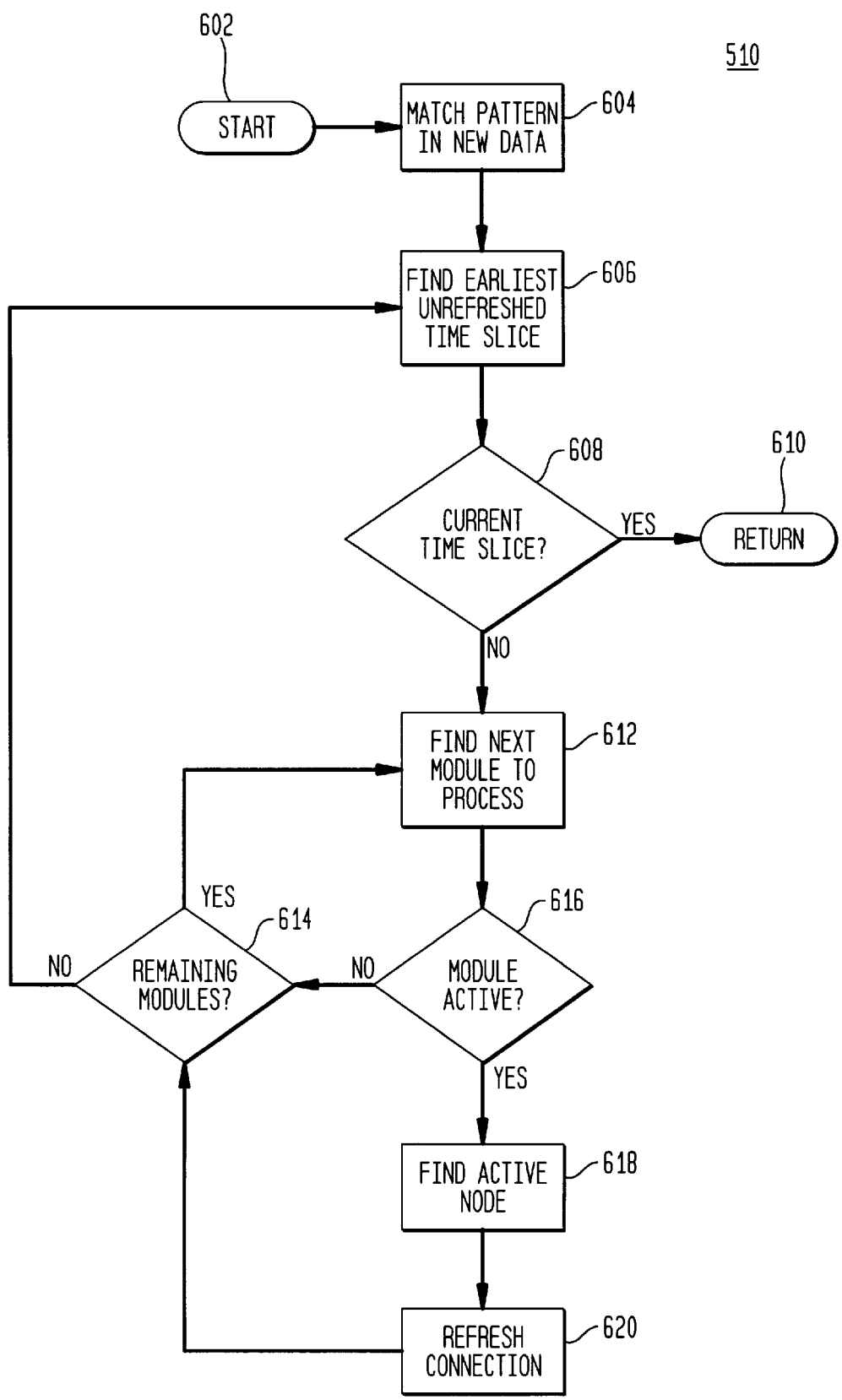
FIG. 6 is a control flow diagram showing the processing of a module in the ATCN.
Figure 7:
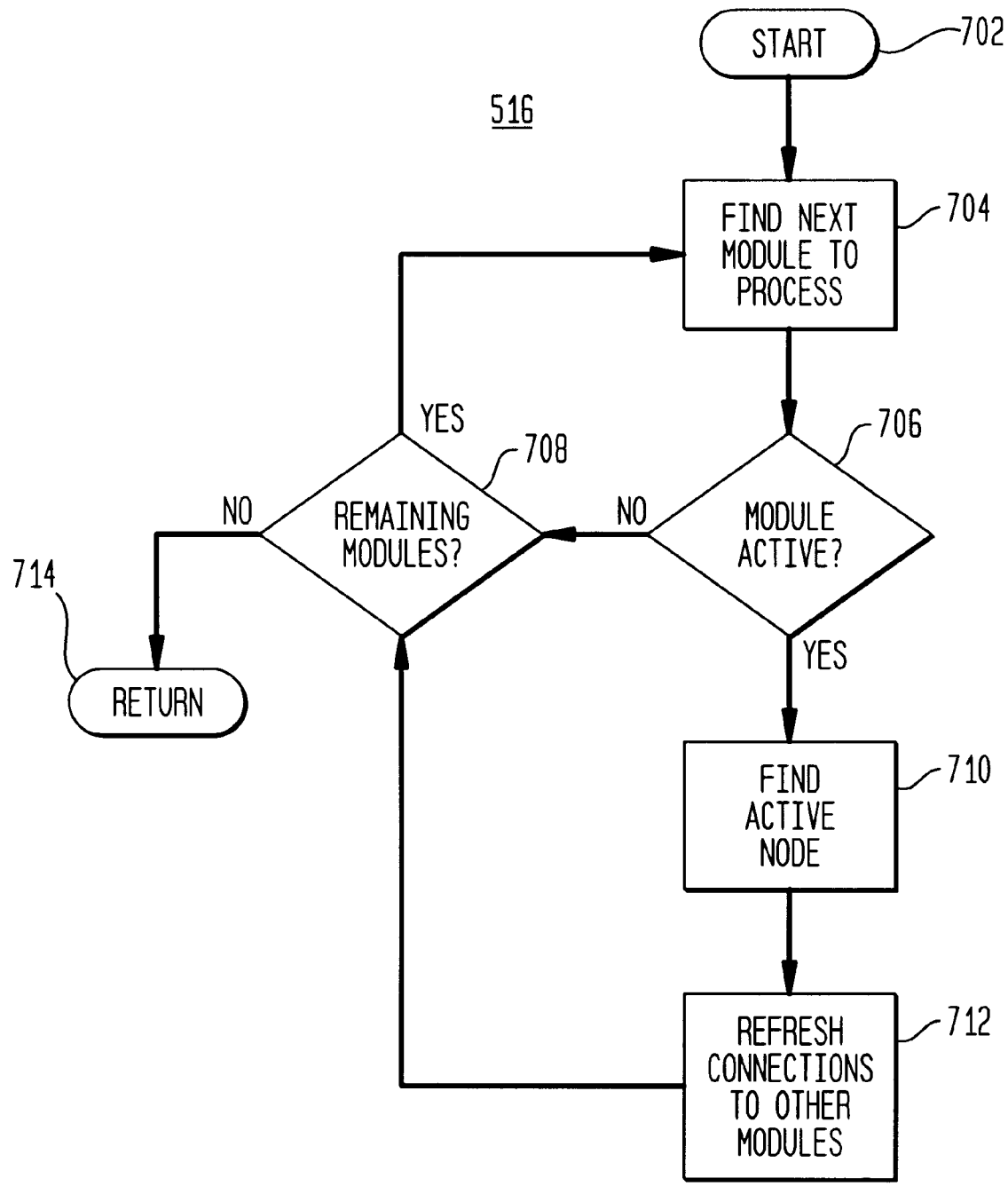
FIG. 7 is a control flow diagram showing the processing of the modules in the current time slice of the ATCN.

FIGS. 5–7 illustrate the control flow of a ATCN 300 processing a current time slice with FIG. 5 illustrating the overall processing. In FIG. 5, processing begins at step 502 and immediately proceeds to step 504. In step 504 the ATCN 300 waits for new data. The incoming data is one or more data streams that occurred at the current time slice, time slice T0 302. Once new data is received, the ATCN 300 advances to step 506. In step 506, the ATCN 300 creates a new, or current, time slice T0 302. The current time slice T0 302 initially consists of a plurality of default modules 204–214, each default module 204–214 having a set of default organized nodes 204*a* and unorganized nodes 204*b*. The ATCN 300 then sets a pointer to a module in the current time slice T0 302. The module in the time slice T0 302 that the ATCN 300 is currently processing is called the current module. The ATCN 300 then proceeds to step 508.

In step 508, the ATCN 300 determines whether it has received a new data stream corresponding to the current module. If there is a new data stream that corresponds to the current module, the ATCN 300 proceeds to step 510. In step 510, the ATCN 300 processes the temporal connections of the current module to the other time slices in the network, T-1 304, T-2 306, T-3 308, according to the corresponding new data stream. Step 510 is described in greater detail below. After completing step 510, the ATCN 300 proceeds to step 512.

Referring again to step 508, if the ATCN 300 determines that it has not received a new data stream that corresponds to the current module, the ATCN 300 proceeds to step 512.

In step 512, the ATCN 300 determines whether the current module is the last module in the current time slice T0 302. If the current module is not the last module, the ATCN 300 proceeds to step 514. In step 514, the ATCN 300 advances its pointer from the current module to the next module in current time slice T0 302 that has not been analyzed for receiving new data Once the pointer is advanced to a new current module, the ATCN 300 returns to step 508. Step 508 has been described in detail above.

Referring again to step 512, if the ATCN 300 determines that the current module is the last module in the current time slice T0 302 to be analyzed, the ATCN 300 proceeds to step 516. In step 516, the ATCN 300 processes the temporal connections of each module in the current time slice T0 302 to the other modules in the current time slice T0 302 according to the new data streams. Step 516 is described in greater detail below. When the ATCN 300 has completed step 516, the ATCN 300 returns to step 504 to wait for the next incoming data streams at the next time slice T+1 402.

FIG. 6 is a control flow diagram showing the processing of step 510 in which the ATCN 300 processes the temporal connections of the current module to the other time slices in the network, T-3 308, T-2 306, T-1 304, according to the corresponding new data stream. Processing begins at step 602 and immediately proceeds to step 604. In step 604, the ATCN 300 analyzes the new data stream and identifies and classifies a data pattern/event found within the new data stream. The ATCN 300 then reviews the current module to determine whether the current module contains an organized node that corresponds to the identified event. If the current module contains the event, the corresponding node is made active. If the current module does not contain an organized node corresponding to the event, the ATCN 300 instantiates an unorganized node in the current module to reflect the new event and makes the node active. Once the ATCN 300 matches the event in the current module, the ATCN 300 makes the current module active and proceeds to step 606.

In step 606, the ATCN 300 finds the earliest time slice, T-1 304, T-2 306, T-3 308, for which the temporal connections to the modules of that time slice have not been refreshed. Therefore, according to the present example, time slice T-3 308 is the earliest time slice for which its temporal connections have not been refreshed. The time slice resulting from step 606 is called the earliest time slice. After setting a pointer to the earliest time slice, the ATCN 300 proceeds to step 608.

In step 608, the ATCN 300 determines whether the earliest time slice found in step 606, e.g. time slice T-3 308, is the current time slice T0 302. If it is not the current time slice T0 302, the ATCN 300 advances to step 612. In step 612, the ATCN 300 finds the next module within the earliest time slice for which its temporal connections must be updated. More specifically, the ATCN 300 loops through all of the modules within the earliest time slice, starting with a first module. The module resulting from step 612 is called the next module. The next module, however, cannot be the same module corresponding to the current module. After the ATCN 300 finds a next module in step 612, the ATCN 300 advances to step 616.

In step 616, the ATCN 300 determines whether the next module is active. A module is active when one of its nodes is active. If the next module is active, the ATCN 300 proceeds to step 618. In step 618, the ATCN 300 finds the active node within the next module then proceeds to step 620. In step 620, the ATCN 300 refreshes the connection between the active node in the current module of the current time slice T0 302 and the active node in the next module in the earliest time slice. In the preferred embodiment of the present invention, the refreshing of a temporal connection comprises the setting of an active/non-active flag associated with the temporal connection. In an alternative embodiment, however, the refreshing of a temporal connection may include a frequency counter, a weighted coefficient, or similar type of statistical measurement for indicating the frequency with which a temporal connection is active. Once the ATCN 300 refreshes the temporal connection, the ATCN 300 proceeds to step 614.

In step 614, the ATCN 300 determines whether the earliest time slice contains a module that has not been processed. If there is a module to process, the ATCN 300 returns to step 612 to find the next module in the earliest time slice to process. If there is not such a module to process, the ATCN 300 returns to step 606 to advance to the next earliest time slice to process its temporal connections.

Referring again to step 616, if the ATCN 300 determines that the current module is not active, or does not have an active node, the ATCN 300 proceeds directly to step 614 because there is no temporal connection to refresh.

Referring again to step 608, if the ATCN 300 determines that the time slice found at step 606 is the current time slice T0 302, the ATCN 300 has completed the processing of all the temporal connections within the network. Therefore, the ATCN 300 advances to step 610 and returns processing to step 510.

FIG. 7 is a control flow diagram showing the processing of step 516 in which the ATCN 300 processes the temporal connections of the modules in the current time slice of the network. Processing begins at step 702 and immediately proceeds to step 704. In step 704, the ATCN 300 finds the next module in the current time slice T0 302 for which its temporal connections must be updated. The next module cannot be the current module. More specifically, the ATCN 300 loops through all of the modules within the current time slice T0 302, starting with a first module. The module resulting from step 704 is called the next module. After the ATCN 300 finds a next module in step 704, the ATCN 300 advances to step 706.

In step 706, the ATCN 300 determines whether the next module is active. A module is active when one of its nodes is active. If the next module is active, the ATCN 300 proceeds to step 710. In step 710, the ATCN 300 finds the active node within the next module then proceeds to step 712. In step 712, the ATCN 300 refreshes the connection between the active node in the current module and the active node in the next module both modules of which are in the current time slice T0 302. In the preferred embodiment of the present invention, the refreshing of a temporal connection comprises the setting of an active/non-active flag associated with the temporal connection. In an alternative embodiment, however, the refreshing of a temporal connection may include a frequency counter, a weighted coefficient, or similar type of statistical measurement for indicating the frequency with which a temporal connection is active. Once the ATCN 300 refreshes the temporal connection, the ATCN 300 proceeds to step 708. Step 708 is described in greater detail below.

Referring again to step 706, if the ATCN determines that the next module is not active, the ATCN proceeds directly to step 708.

In step 708, the ATCN 300 determines whether the current time slice T0 302 contains a module that has not been processed. If there is a module to process, the ATCN 300 returns to step 704 to find the next module in the current time slice T0 302 to process. If there is not such a module to process, the ATCN 300 has completed the processing of all the temporal connections between the modules of the current time slice T0 302. Therefore, the ATCN 300 advances to step 714 and returns processing to step 516.

4. Control Flow of the Prediction of Future Events

Figure 8:
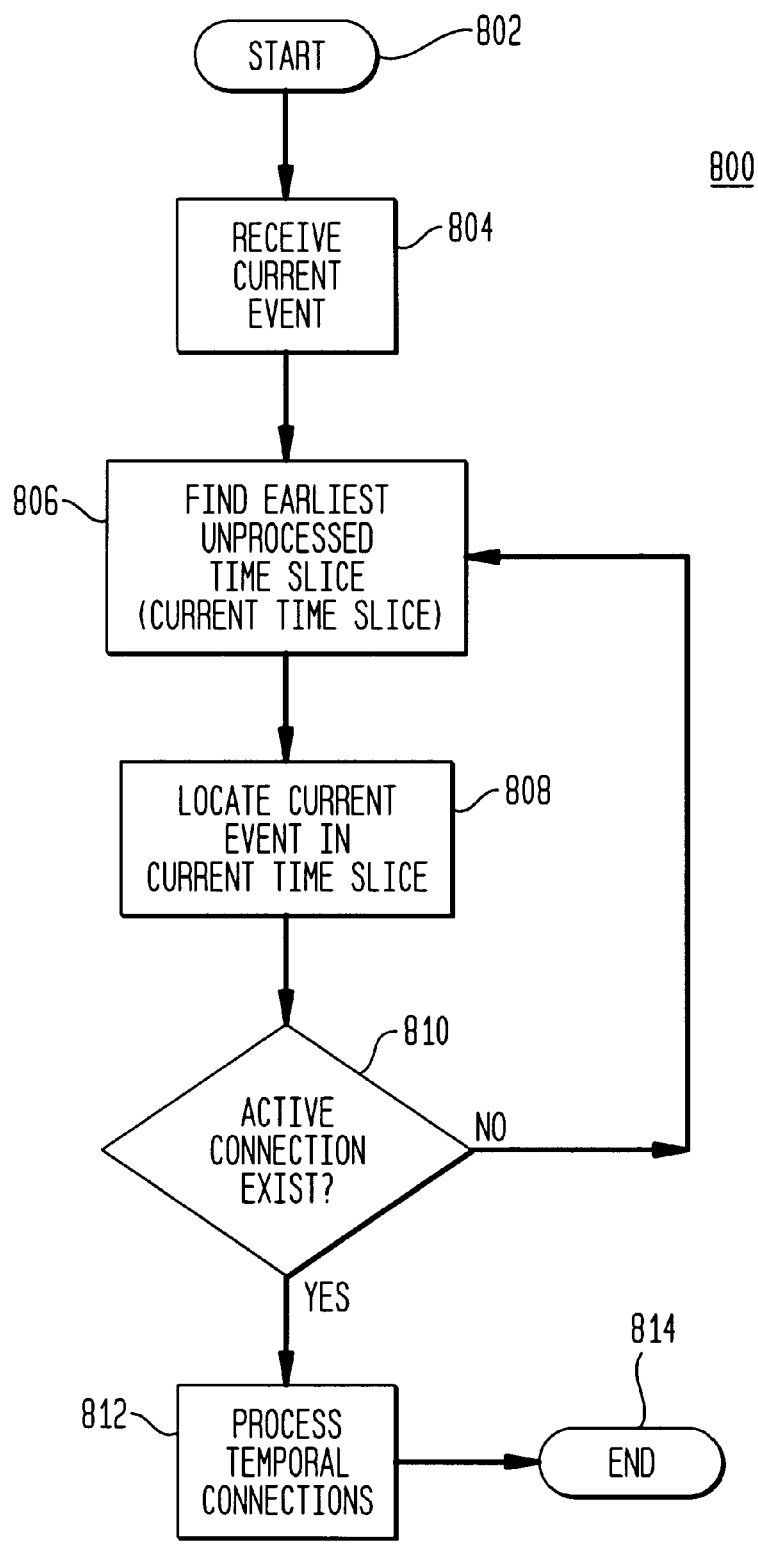
FIG. 8 is a control flow diagram showing the prediction of fixture events in the ATCN.
Figure 9:
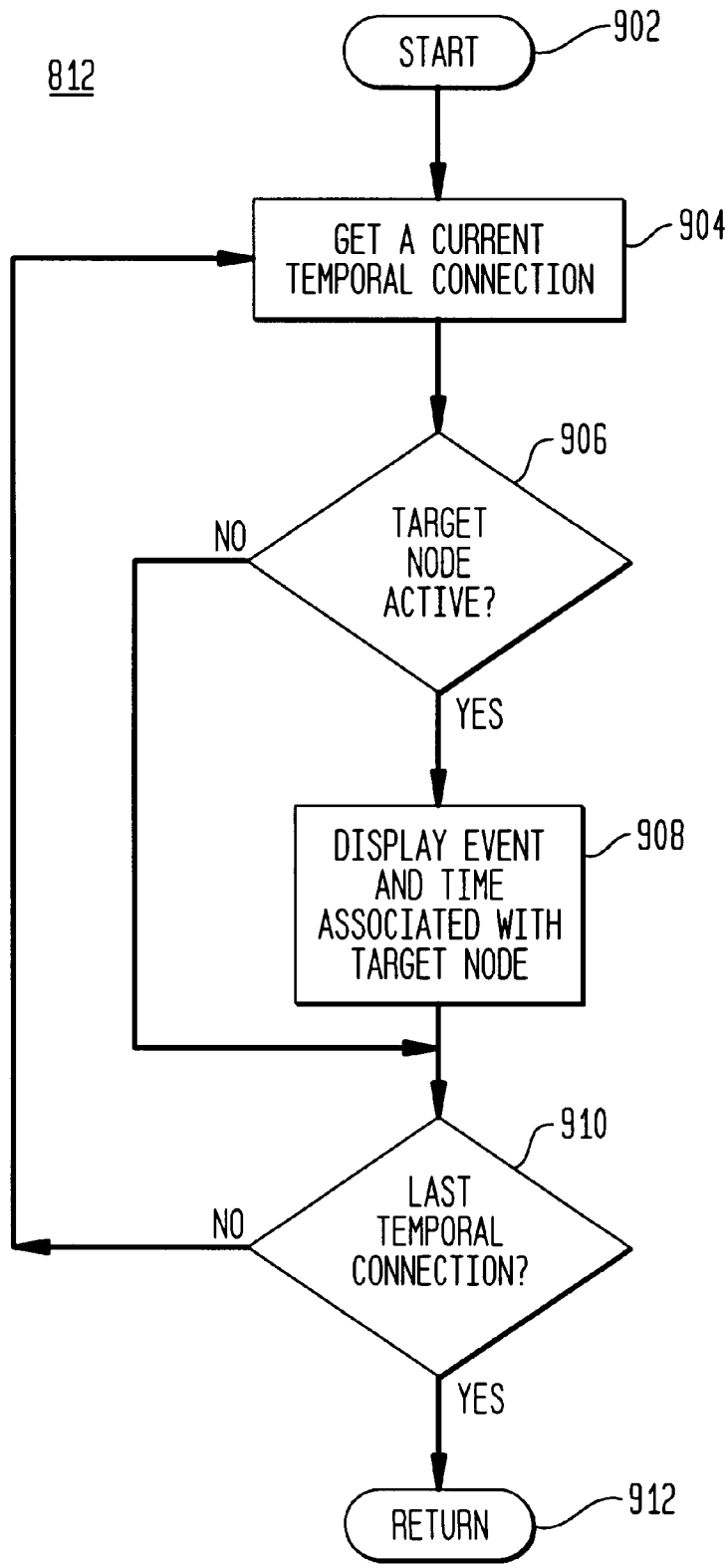
FIG. 9 is a control flow diagram showing the processing of temporal connections during the prediction of future events.

FIGS. 8–9 illustrate the control flow of the prediction of future events with FIG. 8 illustrating the overall processing. In FIG. 8, processing begins at step 802 and immediately proceeds to step 804. In step 804, the ATCN 400 receives a data pattern representing a current event. There are several methods by which the ATCN 400 receives such a current event. First, an already identified and classified data pattern/event can be input directly to the ATCN 400. The ATCN 400 would not have to analyze the data pattern because that processing has already been completed. Second, the data pattern representing the current event can be input to the ATCN 400. Therefore, the ATCN 400 must identify and classify the data pattern according to any known method for analyzing data patterns. Third, a data stream can be input to the ATCN 400 requiring the ATCN 400 to apply more advanced pattern recognition techniques to identify and classify the data pattern. Once the ATCN 400 determines the current event from the input data, the ATCN 400 proceeds to step 806.

In step 806, the ATCN 400 finds the latest unprocessed time slice, T0 302, T–1 304, T–2 306, T–3 308, for which the ATCN 400 has not searched the modules in the unprocessed time slice to locate the current event. Therefore, according to the present example, the current time slice T0 302 is the latest unprocessed time slice for which the ATCN 400 has not searched its modules 302a–302f to match the current event. The time slice resulting from step 806 is called the latest unprocessed time slice. After setting a pointer to the latest unprocessed time slice, the ATCN 400 proceeds to step 808.

In step 808, the ATCN 400 locates the current event in the latest unprocessed time slice. More specifically, the ATCN 400 determines the module and organized node in the latest unprocessed time slice for which the data pattern of the organized node equals the data pattern of the current event. The organized node and its associated module matching the current event are called the current node and current module respectively. Once the ATCN 400 determines the current module and current node, the ATCN 400 proceeds to step 810.

In step 810, the ATCN 400 determines whether an active temporal connection exists originating from the current node. An active temporal connection is one for which the target node is an active node of its associated module. If an active temporal connection exists, the ATCN 400 advances to step 812. In step 812, the ATCN 400 processes the temporal connections originating from the current node to determine all of the active temporal connections for its prediction. Step 812 is described in greater detail below. Once the ATCN 400 analyzes all of the temporal connections originating from the current node, the ATCN 400 has completed its predictions based on the occurrence of the current event, and therefore, proceeds to step 814 and ends it processing.

Referring again to step 810, if there are no active temporal connections originating from the current node, the ATCN 400 returns to step 806 to analyze the next latest unprocessed time slice, T–1 304, T–2 306, T–3 308.

FIG. 9 is a control flow diagram showing the processing of step 812 in which the ATCN 400 loops through the temporal connections originating from the current node to make its prediction of future events. Processing begins at step 902 and immediately proceeds to step 904. In step 904, the ATCN 400 gets a temporal connection. The ATCN 400 retrieves a list of all of the temporal connections originating from the current node and, starting with a first temporal connection, the ATCN 400 consecutively traverses the list. After the ATCN 400 gets a temporal connection, called the current temporal connection, the ATCN 400 proceeds to step 906.

In step 906, the ATCN 400 determines whether the target node to which the current temporal connection points is an active node. If the target node is active, the ATCN 400 proceeds to step 908. In step 908, the ATCN 400 records and displays the information associated with the target node. More specifically, the ATCN 400 retrieves the event, or data pattern, associated with the target node. Also, the ATCN 400 translates the time slice associated with the target node to a time period in the future. For example, if the target node is in time slice T–2 306, then the ATCN 400 would predict the event associated with the target node to occur at time T+2 in the future. Step 908 is described in these terms for convenience purpose only. It would be readily apparent for one skilled in the relevant art to record the predicted events, display the predicted events, or perform a similar function. After the ATCN 400 has processed the predicted events, the ATCN 400 proceeds to step 910.

Referring again to step 906, if the ATCN 400 determines that the target node is not an active node, the ATCN 400 advances directly to step 910.

In step 910, the ATCN 400 determines whether the current temporal connection is the last temporal connection in the list. If it is not the last temporal connection, the ATCN 400 returns to step 904 to get the next temporal connection in the list and processes that connection accordingly. If, however, the ATCN 400 determines that the current temporal connection is the last connection, the ATCN 400 advances to step 912 and returns processing to step 812.

Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A computer-based adaptive temporal correlation network embodied on a computer readable medium for correlating events over time, learning events and predicting events, comprising:

a means for receiving a data stream;

a module, representing said data stream, having one or more organized nodes, wherein each organized node defines an identified and classified event in said data stream;

a plurality of time slices, each time slice having one or more said modules, wherein said data streams of said modules of one said time slice occur within a single time period;

a plurality of temporal connections, each said temporal connection linking one said organized node in one said module with each said organized node in a second said module; and a means for traversing said plurality of temporal connections.

2. The adaptive temporal correlation network of claim 1, wherein each said module has one or more unorganized nodes.

3. The method of training a computer-based temporal correlation network having a plurality of time slices, each time slice having one or more modules, each module representing a data stream and having one or more organized nodes wherein each organized node represents an identified and classified event in the data stream, the data streams of one time slice occurring within a single time period, and having a plurality of temporal connections, each temporal connection linking one organized node in one module with each said organized node in a second module, comprising the steps of:

a. receiving a data stream at a current time slice;
   b. finding a module in said current time slice representing said data stream;
   c. identifying and classifying an event in said data stream;
   d. determining whether an organized node in said module matches said event;
   e. identifying an active organized node if it is determined in step (d) that said active organized node matches said event; and
   f. updating the temporal connections of said active organized node if it is determined in step (d) that said active organized node matches said event.

4. The method of claim 3, wherein step (c) uses a self organizing adaptive device.

5. The method of claim 4, wherein said self organizing adaptive device is Fuzzy ART.

6. The method of claim 4, wherein said self organizing adaptive device is Lead Clustering.

7. The method of claim 3, wherein each said module further comprises one or more unorganized nodes, further comprising the step:

g. instantiating an unorganized node in said module into an organized node if it is determined in step (d) that there is no said organized node in said module that matches said event.

8. The method of claim 3, wherein step (D further comprises the assigning of a weighted value to the temporal connections.

9. The method of predicting the occurrence of one or more events in a computer-based temporal correlation network, the temporal correlation network having a plurality of time slices, each time slice having one or more modules, each module representing a data stream and having one or more organized nodes wherein each organized node represents an identified and classified event in the data stream, the data streams of one time slice occurring within a single time period, and having a plurality of correlation connections, each correlation connection linking one organized node in one module with each said organized node in a second module, comprising the steps of:

a. receiving a current event in a data stream;
   b. determining a latest unprocessed time slice;
   c. locating a module in said latest unprocessed time slice representing said data stream;
   d. identifying an organized node in said module found in step (c) matching said current event;
   e. determining whether an active temporal connection exists that originates from said organized node found in step (d); and
   f. generating a list of active temporal connections if it is determined in step (e) that an active temporal connection exists.

10. The method of claim 9, wherein step (f) comprises the steps of:

(i) selecting a current temporal connection;
   (ii) determining whether said current temporal connection has an active target node thereby being an active temporal connection;
   (iii) retrieving a pattern represented by said active target node if it is determined in step (ii) that said current temporal connection has an active target node; and
   (iv) recording said pattern retrieved in step (iii).

11. The method of claim 9, wherein in step (a) said current event is input directly into the temporal correlation network.

12. The method of claim 9, wherein step (a) further comprises the steps of:

(i) receiving said data stream; and
   (ii) identifying and classifying said current event in said data stream.

13. The method of claim 12, wherein step (a)(ii) uses a self organizing adaptive device.

14. The method of claim 13, wherein said self organizing adaptive device is Fuzzy ART.

15. The method of claim 13, wherein said self organizing adaptive device is Lead Clustering.

16. A computer program product for use with a computer system, comprising:

a computer readable medium having computer readable program code means embodied in said medium for training a computer-based temporal correlation network to recognize events over time, having a plurality of time slices, each time slice having one or more modules, each module representing a data stream and having one or more organized nodes wherein each organized node represents an identified and classified event in the data stream, the data streams of one time slice occurring within a single time period, and having a plurality of temporal connections, each temporal connection linking one organized node in one module with each said organized node in a second module, said computer program product comprising:

receiving means for enabling a processor to receive a data stream at a current time slice;
   finding means for enabling a processor to find a module in said current time slice representing said data stream;
   identifying means for enabling a processor to identify and classify an event in said data stream;
   determining means for enabling a processor to determine whether an organized node in said module matches said event;
   second identifying means for enabling a processor to identify an active organized node if said determining means determines that said active organized node matches said event; and
   updating means for enabling a processor to update the temporal connections of said active organized node if said determining means determines that said active organized node matches said event.

17. The computer program product of claim 16, wherein each said module further comprises one or more unorganized nodes, further comprising instantiating means for enabling a processor to instantiate an unorganized node in said module into an organized node if said determining means determines that there is no said organized node in said module that matches said event.

18. The computer program product of claim 16, wherein said updating means further comprises means to assign a weighted value to the temporal connections.

19. A computer program product for use with a computer system, comprising:

a computer readable medium having computer readable program code means embodied in said medium for predicting the occurrence of one or more events over time in a computer-based temporal correlation network, the temporal correlation network having a plurality of time slices, each time slice having one or more modules, each module representing a data stream and having one or more organized nodes wherein each organized node represents an identified and classified event in the data stream, the data streams of one time slice occurring within a single time period, and having a plurality of correlation connections, each correlation connection linking one organized node in one module with each said organized node in a second module, said computer program product comprising:

receiving means for enabling a processor to receive a current event in a data stream;

determining means for enabling a processor to determine a latest unprocessed time slice;

locating means for enabling a processor to locate a module in said latest unprocessed time slice representing said data stream;

identifying means for enabling a processor to identify an organized node in said module found by said locating means matching said current event;

determining means for enabling a processor to determine whether an active temporal connection exists that originates from said organized node found by said identifying means; and generating means for enabling a processor to generate a list of active temporal connections if said determining means determines that an active temporal connection exists.

20. The computer program product of claim 19, wherein said generating means comprises:

selecting means for enabling a processor to select a current temporal connection;

second determining means for enabling a processor to determine whether said current temporal connection has an active target node thereby being an active temporal connection;

retrieving means for enabling a processor to retrieve a pattern represented by said active target node if said second determining means determines that said current temporal connection has an active target node; and recording means for enabling a processor to record said pattern retrieved by said retrieving means.

21. The computer-based adaptive temporameans for traverswork of claim 1, wherein said means for traversing said plurality of temporal connections is a means for training the computer-based adaptive temporal correlation network, comprising:

a computer readable means for receiving a data stream at a current time slice;

a computer readable means for finding a module in said current time slice representing said data stream;

a computer readable means for identifying and classifying an event in said data stream;

a computer readable means for determining whether an organized node in said module matches said event;

a computer readable means for identifying an active organized node if said computer readable means for determining determines that said active organized node matches said event; and a computer readable means for updating said plurality of temporal connections of said active organized node if said computer readable means for determining determines that said active organized node matches said event.

22. The computer-based adaptive temporal correlation network of claim 21, wherein said module further comprises one or more unorganized nodes, further comprising a computer readable means for instantiating an unorganized node in said module into an organized node if said computer readable means for determining determines that there is no said organized node in said module that matches said event.

23. The computer-based adaptive temporal correlation network of claim 1, wherein said means for traversing said plurality of temporal connections is a means for predicting the occurrence of one or more events in the computer-based adaptive temporal correlation network, comprising:

a computer readable means for receiving a current event in a data stream;

a computer readable means for determining a latest unprocessed time slice;

a computer readable means for locating a module in said latest unprocessed time slice representing said data stream;

a computer readable means for identifying an organized node in said module found by said computer readable means for locating matching said current event;

a computer readable means for determining whether an active temporal connection exists that originates from said organized node found by said computer readable means for identifying; and a computer readable means for generating a list of active temporal connections if said computer readable means for determining determines that an active temporal connection exists.

24. The computer-based adaptive temporal correlation network of claim 23, wherein said computer readable means for generating comprises:

a computer readable means for selecting a current temporal connection;

a computer readable means for determining whether said current temporal connection has an active target node thereby being an active temporal connection;

a computer readable means for retrieving a pattern represented by said active target node if said computer readable means for determining determines that said current temporal connection has an active target node; and a computer readable means for recording said pattern retrieved by said computer readable means for retrieving.

* * * * *

UNITED STATES PATENT AND TRADEMARK OFFICE
CERTIFICATE OF CORRECTION

PATENT NO : 6,081,797
DATED : June 27, 2000
INVENTOR(S) : Ben A. Hitt

It is certified that error appears in the above-identified patent and that said Letters Patent are hereby corrected as shown below:

Column 1, Line 24    delete "arses", and insert therefor --arises--.

Column 2, Line 17    delete "flizziness", and insert therefor --fuzziness--.

Column 2, Line 25    delete "fails", and insert therefor --falls--.

Column 3, Line 47    delete "fixture", and insert therefor --future--.

Column 7, Line 67    delete "402a-t", and insert therefor --402a-f--.

Signed and Sealed this

Eighth Day of May, 2001

*Attest:*

NICHOLAS P. GODICI

*Attesting Officer*    *Acting Director of the United States Patent and Trademark Office*